Jan. 24, 1933.   F. F. LOVE   1,895,256
DROP CABIN PLANE
Filed Oct. 9, 1931   2 Sheets-Sheet 1

INVENTOR
FRANK F. LOVE
BY Robert H. Young
ATTORNEY

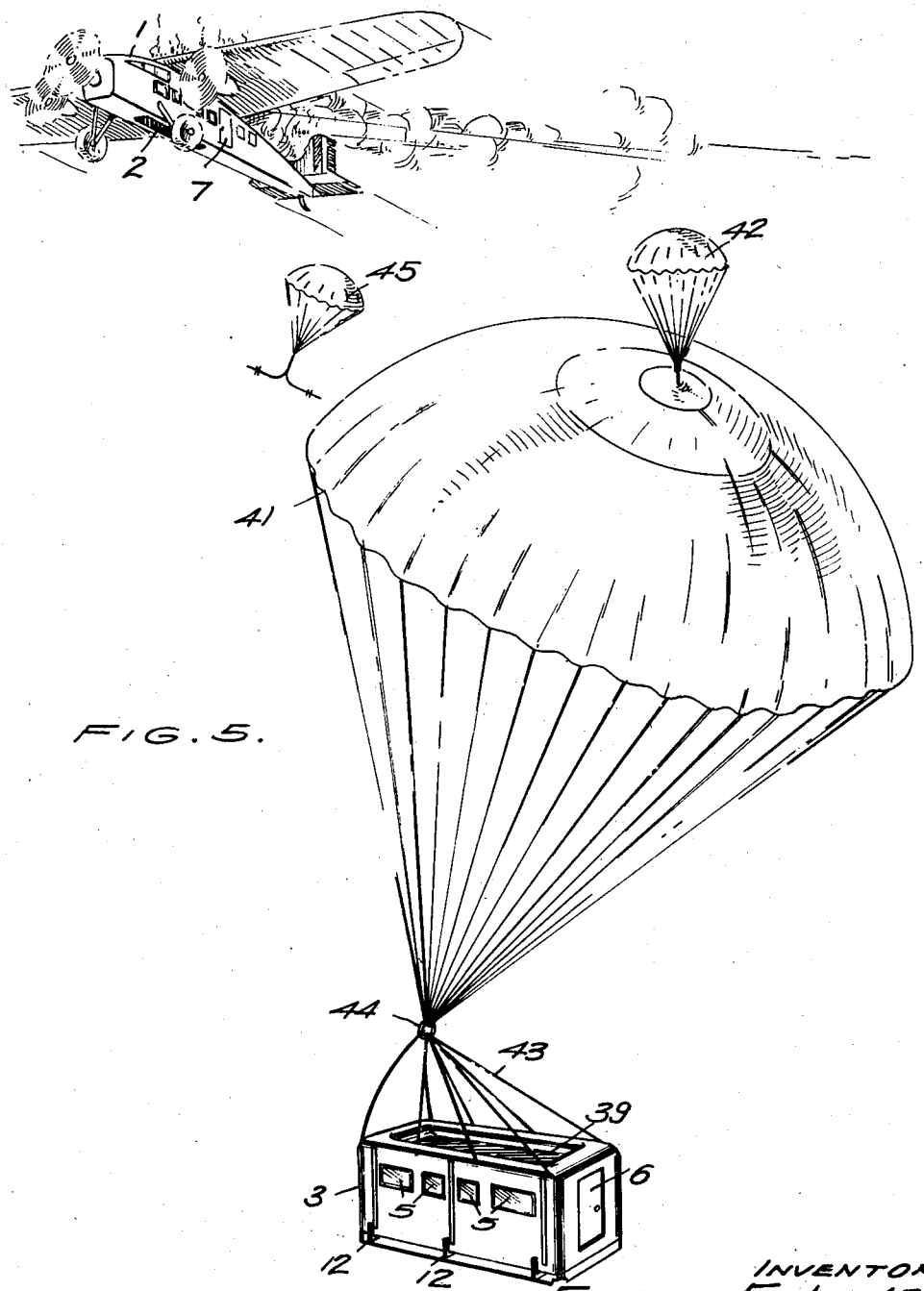

Patented Jan. 24, 1933

1,895,256

UNITED STATES PATENT OFFICE

FRANK F. LOVE, OF SAN ANTONIO, TEXAS

DROP CABIN PLANE

Application filed October 9, 1931. Serial No. 567,794.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention has reference to improvements in passenger-carrying airplanes, particularly of the cabin type and the principal object of the invention is to provide for the safe landing of the passengers in times of emergency by separating the passenger-carrying cabin from the remainder of the airplane.

Further objects of the invention are, first, to provide a droppable cabin for use in Army and commercial cabin airplanes; second; to provide improved means for releasing and forcibly ejecting the cabin from the airplane with a minimum frictional resistance between the cabin and the fuselage of the airplane, and third, to provide means for automatically opening the supporting parachute of the droppable cabin when the latter is free of the airplane.

With the above objects in view, the invention resides in the novel combination and arrangement of parts hereinafter more fully described with reference to the accompanying drawings, wherein:

Figure 5 is a view illustrating the launching of the drop cabin.

Figure 1:
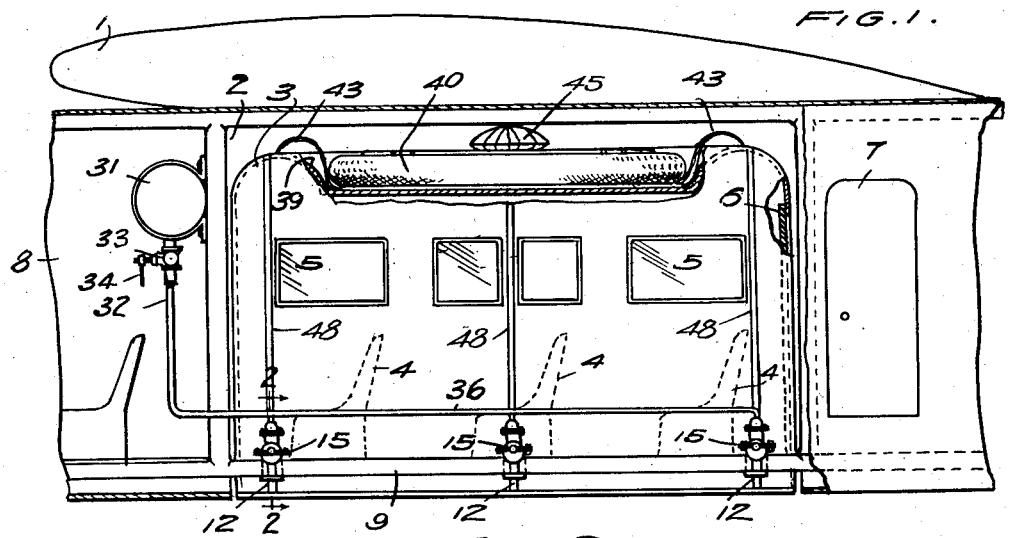
Figure 1 is a side view of a portion of a cabin plane partly broken away to disclose certain features of the invention.

In applying the invention to a cabin plane, such as indicated at 1, the latter is provided with a suitable space 2 in which is accommodated the droppable cabin 3. The latter is a separate unit and contains the seats 4 for the passengers as well as any number of observation windows 5. Passengers enter and leave the droppable cabin through a door 6 in one end thereof which door opens into a part of the main fuselage having the outer door 7 through which access to the interior of the airplane is obtained. The pilot's compartment is located forwardly of the droppable cabin, as shown at 8. The droppable cabin 3 is located between the longérons 9 and 10 of the fuselage and on the underside is provided with a plurality of transversely extending supports or carrying bars 11 relatively spaced apart and respectively provided at each end with a vertical extension or hanger arm 12 having a recess 13 for accommodating the end of the stay-bolt 14 of one of the trip-lock mechanisms. Any desired number of lock bolts and trip-lock mechanisms may be employed.

Figure 2:
Figure 2 is a transverse sectional view, on an enlarged scale, of the airplane taken on line 2—2 of Fig. 1.
Figure 3:
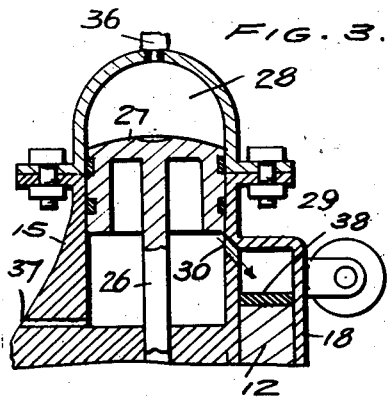
Figure 3 is an enlarged detail view in section of the pressure-operated safety kick lock.
Figure 4:
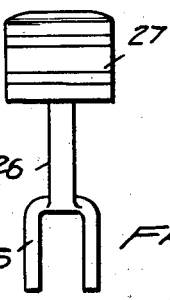
Figure 4 is a detail view of the lock piston.

Each trip-lock mechanism includes a casing 15 rigidly mounted on a supporting bracket 16 secured to a longéron by welding or by other means. The stay-bolt 14 of the casing is mounted for horizontal sliding movement in the casing and is normally positioned with its forward end extended into the hanger-arm guide 18 for lodgment in the recess 13 of hanger arm 12 housed therein, as shown in Figure 2. The stay-bolt is yieldably held in its extended position by a helical spring 19 suitably housed in the casing as shown at 20 and encircling the rearward portion of the bolt between the collar 21 and the tension-adjusting nut 22. Extending upwardly from adjacent the forward end of the stay-bolt is a lug 23 having a cam surface 24 on its front face with which engages the forked end 25 of a pusher rod 26 carrying at its upper end a piston 27. The piston 27 works in the main or primary pressure chamber 28 of the lock casing and is adapted upon the introduction of pressure into the chamber to be moved downwardly, causing the forked end of the pusher arm to force the cam lug and stay bolt back against the tension of the spring, thereby dislodging the end of the stay bolt from the recess 13 and permit the cabin 3 to drop.

It will be observed that each hanger arm 12, when in locked position within its guide housing 18, is shorter in length than the housing with a resultant space 29 intervening between the top of the guide housing and the top of the arm. This resultant space forms a secondary pressure space or chamber into which pressure is admitted through the port 30 from the primary pressure chamber 28 when the piston 27 is in its lowermost position. The trip-lock mechanisms are all operated simultaneously from the pilot's compartment 8 wherein is suitably located a pressure tank 31 containing fluid under pressure. The feed line 32 of the tank has a control valve 33 so located that the operating lever 34 is convenient to the pilot. At its lower end, the feed line 32 connects with branch lines 35 and 36 leading to the right and left hand sets of lock mechanisms, respectively, as will be apparent from Figures 1 and 2.

In case of an emergency, the pilot warns the passengers by a signal light or other means, that they are to be released from the plane and after a reasonable lapse of time in which to prepare themselves, pulls the lever 34, opening the valve 33 and permitting the fluid under pressure in the tank to rush to all the locks, filling the primary pressure chamber of each lock casing. When the various pressure-actuated pistons 27 are moved downwardly by the pressure above, releasing the locks in the manner previously described, the ports 30 are uncovered and the pressure enters the secondary pressure chambers 29 where it is effective upon the hanger arms 12 for forcibly ejecting same from the guide housings. Air vents 37 are located at appropriate places, as illustrated, to prevent any of the moving parts from being air-bound and escape of pressure past the hanger arms 12 is prevented by suitable packing 38.

The roof of the drop-cabin 3 is formed with a pocket 39 in which is located the parachute packet 40 containing the cabin-supporting parachute 41 together with the pilot chute 42. The parachute 41 is attached to the cabin by shroud lines 43 which, in the folded position of the parachute, are extended directly underneath the packet 40 and secured to the parachute ring 44 for the purpose of taking care of unbalanced weights of passengers or load. The shroud lines 43 are attached by any suitable means to the cabin so that they may be released when the latter is safely landed. Above the packet 40 is arranged an open ripping chute 45 connected to the rip cord of the packet. As soon as the released cabin has fallen below bottom of lower longerons of the fuselage, the force of the air striking against the ripping chute pulls it apart from the packet, breaking the tying string and ripping open the main parachute packet 40. The pilot chute being thus released, springs out and holds the top of the main chute 41 until the latter is fully inflated, as shown in Fig. 5.

To provide for the placement and dropping of the cabin with the least possible frictional resistance, each lock-mechanism is provided with an anti-friction roller 47 for engaging a correspondingly located track 48 on the cabin. This arrangement enables the cabin to fall freely when released. The carrying or ridging bars 11, in addition to their function of providing hanger supports for the cabin also impart rigidity to the fuselage and prevent the latter from spreading under stress or strain.

From the foregoing it is believed that the operation and advantages of the invention will be readily apparent and it is to be understood also that the invention is susceptible of various modifications in construction, arrangement, and combination of parts as fall within the scope of the appended claims.

I claim:

1. An airplane having a droppable cabin, a vertical hanger arm on said cabin, a horizontal movable detent member engageable with said hanger arm for holding the cabin in place, elastic means normally holding the detent member engaged with the said arm, a pusher rod movable against the said detent member for disengaging it from the hanger arm, and means responsive to fluid pressure for actuating said pusher rod.

2. An airplane having a droppable cabin, a hanger arm on said cabin provided with a recess, a stay-bolt engageable in said recess for holding the cabin in place, said bolt having a cam surface, means holding the bolt yieldably engaged in said recess, a pressure actuated pusher rod engageable with the cam surface of the stay bolt and movable thereagainst to dislodge the bolt from the said recess, a pressure supply, means for releasing the pressure to actuate the said pusher rod, and means for diverting some of the pressure against the said hanger arm to aid in forcibly ejecting the cabin from the airplane.

3. A drop cabin airplane comprising a fuselage having a cabin accommodating space, a drop-cabin in said space, bottom support members carried by and extending upwardly of the sides of the drop-cabin, housings on the fuselage engaging over the said support member, holding devices associated with said housings and engaged with the cabin support members, and means responsive to fluid pressure for releasing said holding devices.

4. A drop cabin plane including a cabin-receiving space opening inwardly of the lower longerons of the fuselage, vertically disposed hollow guides secured to and disposed inwardly of the longerons, a drop-cabin within the said space, hanger arms secured to the bottom of said drop-cabin and extending upwardly in spaced relation to the sides of the cabin and engaging in the said hollow guides, anti-friction bearings on the said guides and between the guides and the adjacent sides of the cabin, and releasable means normally retaining the said hanger arms within the said guides.

In testimony whereof I affix my signature.

FRANK F. LOVE.